Patented Feb. 26, 1924.

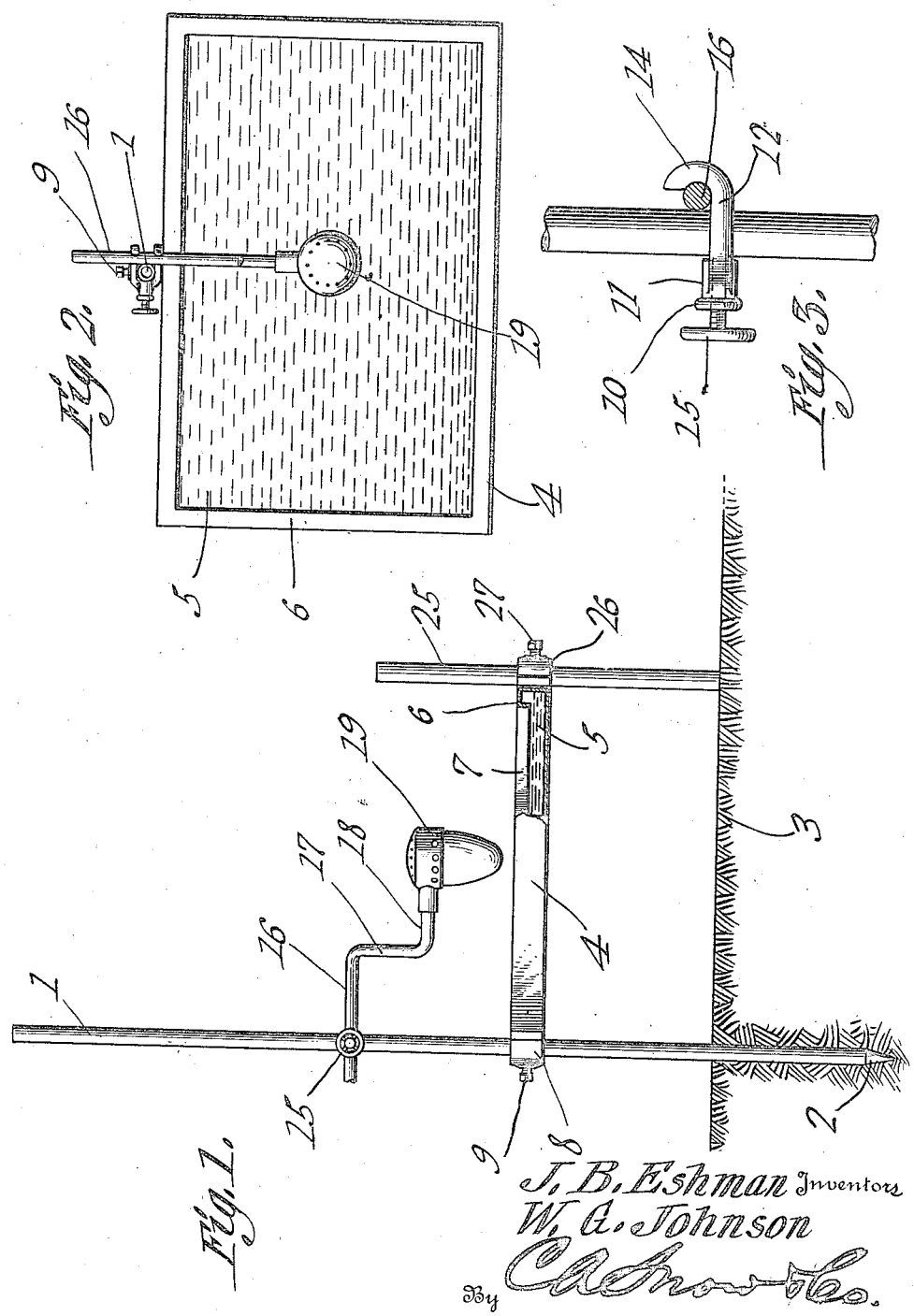

1,484,703

UNITED STATES PATENT OFFICE.

JOSEPH B. ESHMAN AND WILLIAM G. JOHNSON, OF EUREKA SPRINGS, ARKANSAS.

BUG DESTROYER.

Application filed September 1, 1923. Serial No. 660,534.

*To all whom it may concern:*

Be it known that we, JOSEPH B. ESHMAN and WILLIAM G. JOHNSON, citizens of the United States, residing at Eureka Springs, in the county of Carroll and State of Arkansas, have invented a new and useful Bug Destroyer, of which the following is a specification.

This invention aims to provide a simple means whereby boll weevils and other insects may be collected and destroyed the device being adjustable so that it may be used either close to the ground or at considerable elevation near the branches of a tree, novel means being provided for adjusting vertically, the pan in which the insects are collected, novel means being provided whereby the lamp may be adjusted vertically with respect to the pan. It is within the province of the disclosure to improve generally and to enhance the utility of devices of that sort to which the invention appertains.

Although one form of the invention is shown in the drawings, it is to be understood that a mechanic, working within the scope of what is claimed, may make changes in the precise form shown, without departing from the spirit of the invention.

In the drawings: Figure 1 shows in side elevation, a device constructed in accordance with the invention, parts being broken away; Figure 2 is a top plan; Figure 3 is an elevation showing the means for holding the fuel supply pipe on the support or staff.

In carrying out the invention, there is provided a support or staff 1, having a point 2, enabling the staff to be thrust readily into the ground 3. A pan 4 is provided and is adapted to hold a poisonous substance 5, the pan being supplied with an inwardly extended flange 6 having a depending lip 7 spaced from the side wall of the pan, the lip preventing the contents of the pan from slopping out, and serving, also, to retain the insects which drop into the pan. The pan 4 has a socket 8 on one edge, and through the socket, the staff 1 passes, a clamping device 9, such as a screw, being threaded into the socket and being adapted to engage the staff. A carrier 10 is adjustable vertically on the staff 1, above the pan 4, and includes a hub 11 provided with arms 12 located on opposite sides of the staff, the arms terminating in securing elements 14, such as upstanding hooks. A clamp 15, which may be a screw, is threaded into the hub 11 and is adapted to bear on the staff 1. A supply pipe 16 extends transversely of the staff 1 and is engaged by the hooks 14. The pipe 16 has a depending portion 17 terminating in an end member 18 disposed parallel to the part 16 and carrying a lamp 19 of any desired sort, located above the pan 4.

When the parts are arranged as shown in Figure 1, the lamp 19 produces an exceedingly bright light which attracts the insects, the insects falling into the pan 4, wherein their destruction is completed by the poison 5 in the pan. By loosening the screw 9, the pan 4 may be moved to adjusted vertical positions, and by backing out the clamp screw 15, the carrier 10 and the lamp 19 may be adjusted vertically. The pan 4, thus, may be disposed at any desired height with respect to the ground, as may also the lamp 19, it being possible to adjust the lamp with respect to the pan and the pan with respect to the lamp. When the clamp screw 15 is advanced, the pipe 16 is drawn by the hooks 14 against the staff 1, and, thus, the lamp 19 is held at any height to which it may have been adjusted.

The device may be used close to the ground, for the killing of boll weevils on cotton plants or the like, or it may be used at considerable height when it is desired to rid a tree of parasites of any sort for which the tree may be a host.

The lamp 19 may be swung around so that it is to the left of the staff 1, instead of to the right of the staff, as shown in Figure 1. The lamp then is located at one side of the pan 4 and is not above the pan, there being no danger of igniting the substance 5 in the pan, should the same happen to be of an inflammable nature, and should the operator happen to drop the match wherewith the lamp 19 is lighted.

The pan 4 may be supported by a prop 25 held in a socket 26 on the pan by a set screw 27. The prop 25 may be replaced by any equivalent means.

What is claimed is:

In a device of the class described, a support, a pan on the support, means for mounting the pan on the support for raising and lowering, a lamp located above the pan, and means for mounting the lamp for vertical adjustment on the support and for movement to a position at one side of the pan.

In testimony that we claim the foregoing as our own, we have hereto affixed our signatures.

JOSEPH B. ESHMAN.
WILLIAM G. JOHNSON.